Figure 1:
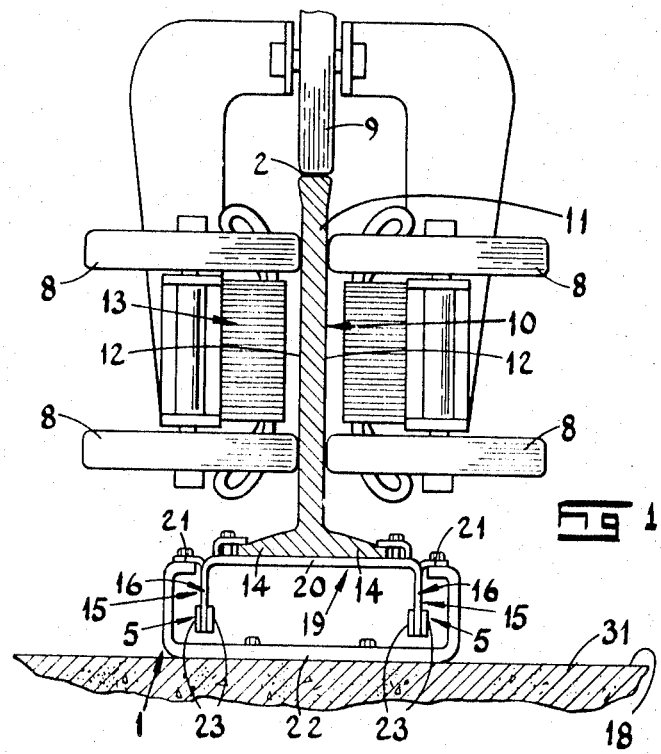

United States Patent
Nicholson

[15] 3,650,469
[45] Mar. 21, 1972

[54] LINEAR MOTOR REACTION RAIL ASSEMBLY

[72] Inventor: Brian John Nicholson, Milton, England
[73] Assignee: Tracked Hovercraft Limited, London, England
[22] Filed: Feb. 20, 1970
[21] Appl. No.: 12,996

[30] Foreign Application Priority Data

Feb. 21, 1969 Great Britain..........................9,536/69
May 5, 1969 Great Britain........................22,900/69

[52] U.S. Cl..............................................238/264, 238/284
[51] Int. Cl...............................................E01b 9/30
[58] Field of Search..........................238/284, 1, 283, 264; 104/148 LM

[56] References Cited

UNITED STATES PATENTS 2,024,114 12/1935 Ross et al...........................238/284
719,453 2/1903 Fox...................................238/284

*Primary Examiner*—Arthur L. La Point
*Assistant Examiner*—Richard A. Bertsch
*Attorney*—Cameron, Kerkam and Sutton

[57] ABSTRACT

A mounting for attaching to a prepared track a reaction plate for cooperation with a double-sided linear induction motor stator carried by a vehicle arranged for operation along the track whereby to propel the vehicle. The mounting has two spring arrangements which are disposed one to either side of the reaction plate and each of which comprises first and second leaf spring means each comprising a leaf spring which lies in a plane parallel to the plate. In each spring arrangement the leaf springs of the two leaf spring means extend in the same direction to a mutual connection. The mounting is such that a side force on the plate causes the plate to undergo lateral movement with little or no other movement, rotational or translateral.

11 Claims, 14 Drawing Figures

PATENTED MAR 21 1972

3,650,469

SHEET 1 OF 4

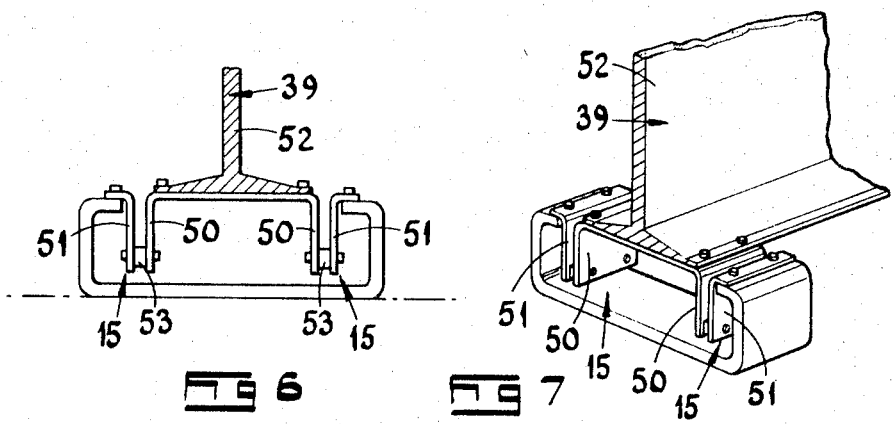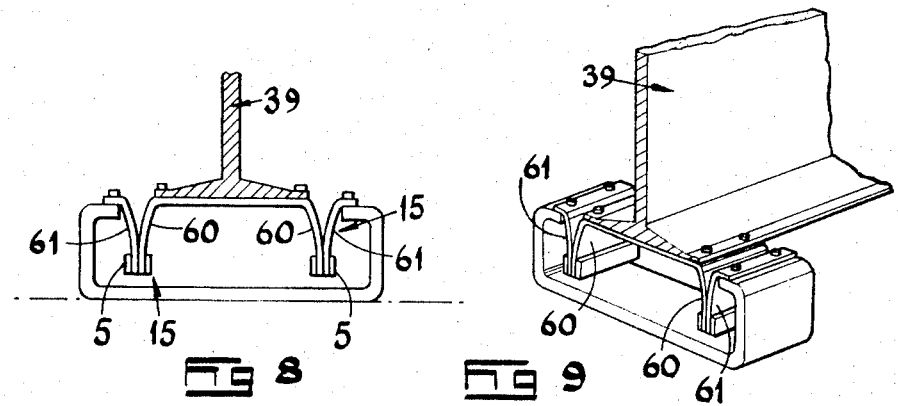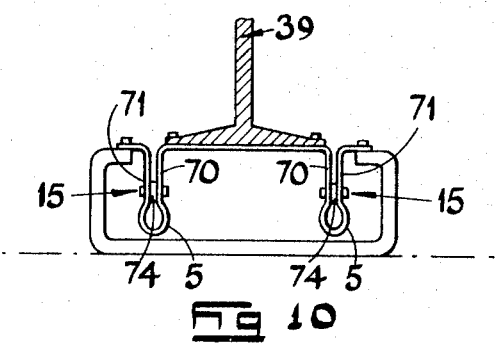

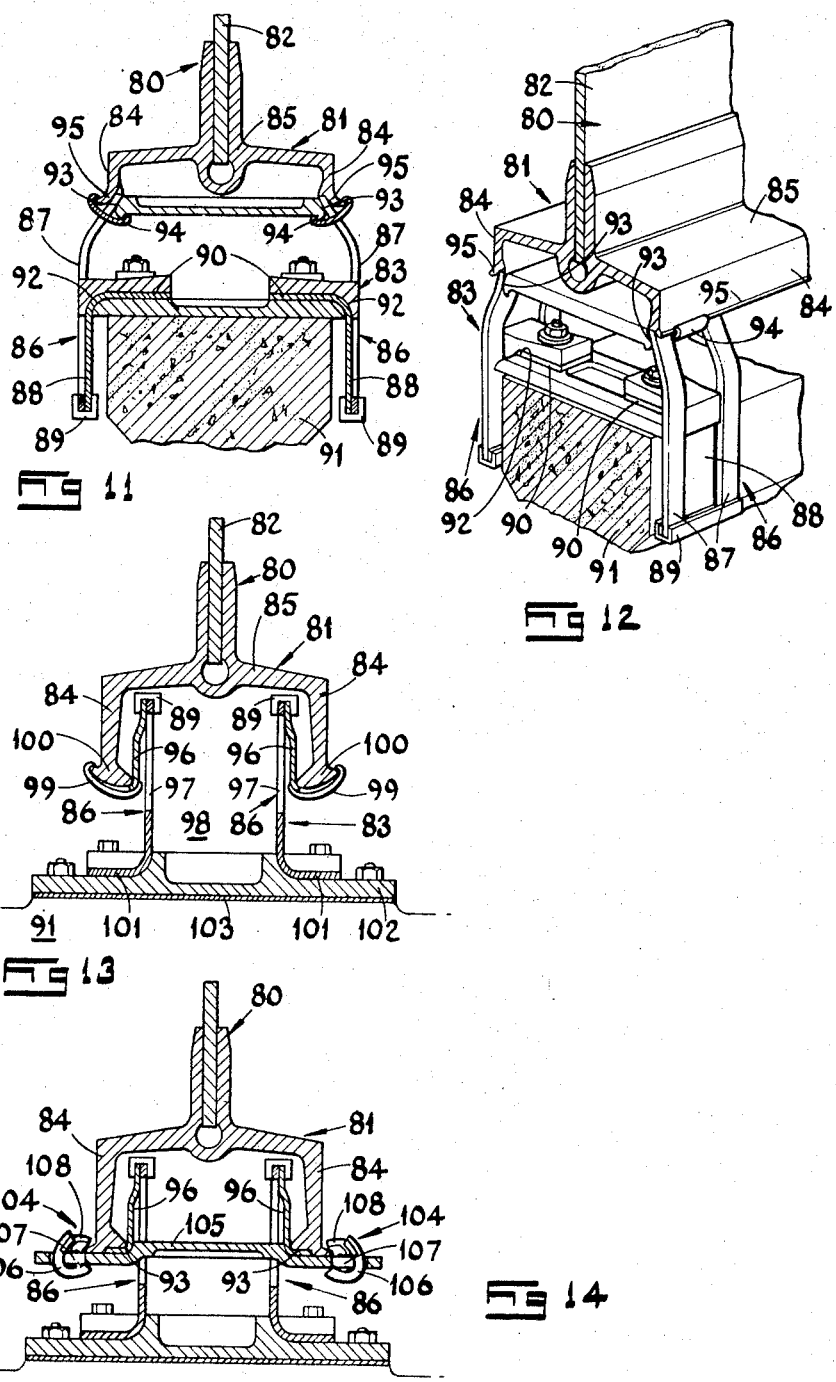

3,650,469

1

LINEAR MOTOR REACTION RAIL ASSEMBLY

This invention relates to a mounting for attaching to a prepared track a reaction rail for co-operation with the stator of a linear electric induction motor. In one known use for a linear induction motor the energized part of the motor (the stator) is connected to, and propels, a vehicle along a track to which is attached the other part of the motor in the form of a fixed reaction rail (sometimes known as the rotor). The rotor and stator are so named because their functions are analogous to the rotor and stator of a rotary induction motor.

The invention relates in particular to a mounting for a reaction rail for co-operation with a stator having two parts disposed in use on opposite sides of the rail so that the flux path extends from one part through the rail to the other part. A motor having such a stator is hereinafter referred to as a double-sided linear induction motor.

British Pat. Nos. 995127 and 1002588 propose the use of a linear induction motor to propel a tracked hovercraft, i.e., a gas cushion supported vehicle for travelling along a track which guides the vehicle. Tracked hovercraft are capable of speeds greater than 200 m.p.h. and at such speeds a problem arises because of the difficulty of mounting the rotor in a straight line.

In accordance with the invention, a mounting for attaching to a prepared track a reaction rail including an electrically conductive reaction plate for co-operation with a double-sided linear induction motor stator connected to a vehicle operable along the track so as to propel the vehicle, comprises two spring arrangements one on each side of the plate, each spring arrangement comprising first and second leaf spring means for connection to, or connected to, the reaction rail and the track respectively, each leaf spring means comprising a leaf spring disposed generally in a plane which is parallel to and displaced laterally from the reaction plate; in each spring arrangement the said leaf springs extending transversely of the plate in the same direction to a mutual connection, the leaf spring arrangements being such that in response to a side force imposed upon the reaction plate flexing of the leaf springs causes the reaction plate to undergo lateral movement without any other substantial movement, rotational or translational.

By allowing the lateral movement without any other substantial movement, rotational or translational, the guidance of the stator by means of the rail is eased and the possibility of damage to the motor is reduced.

The stator of a double-sided linear induction motor co-operable with the reaction plate can be guided on the rail by wheels or by air cushions and if the stator imposes a sideways force on the plate the leaf springs will deflect and the plate moves laterally. Preferably the first and second leaf spring means of each spring arrangement have the same modulus of elasticity and the same natural length so that the reaction plate is constrained to move laterally without any other substantial movement, rotational or translational, by the symmetry of bending of the leaf springs. The necessary shortening of the leaf springs to allow deflection is taken up by movement of the connected ends of the leaf springs of the first and second leaf spring means of each spring arrangement. Thus the plate will not tilt. Although the spring arrangements may be offset longitudinally of the reaction plate, they are preferably aligned transversely of the plate.

In each spring arrangement the interconnected leaf springs of the first and second leaf spring means may be disposed opposite each other transversely of the reaction rail. Such an arrangement is more compact than an arrangement as described below in which the interconnected leaf springs in each spring arrangement are offset longitudinally of the reaction plate, and has the additional advantage that the possible lateral displacement of the reaction rail is naturally limited by the transverse spacing between the interconnected leaf springs.

Alternatively, the interconnected leaf springs of the first and leaf spring means of each spring arrangement may lie substantially on the same plane parallel to the reaction plate. In each spring arrangement, one of the leaf spring means may then comprise two leaf springs, one on each side of a leaf spring of the other leaf spring means.

In each spring arrangement, the interconnected leaf springs of the first and second spring means may be integral with one another and in one preferred embodiment of the invention each spring arrangement comprises two leaf springs formed from a single sheet of resilient material bent back on itself.

Likewise, the first leaf spring means of the two leaf spring arrangements may be integral with one another. For example, they may be provided by the two arms of a generally U-shaped member of which the central part is connectable to, or connected to, the reaction rail. The second leaf spring means of the spring arrangements can be formed in an analogous way.

Integral extensions can extend laterally from the second leaf spring means for connection to the track and these extensions on a pair of laterally spaced arrangements can extend inwardly towards each other or outwardly away from each other. Where the extensions extend inwardly the mounting can be made more compact than otherwise, but where the extensions extend outwardly it is easier to ensure that the first and second leaf spring means are symmetrical in bending so that the rail tilts as little as possible.

The interconnected leaf springs may be connected by elements extending on both sides of the leaf springs and clamped together. The elements are preferably movable along the lengths of the springs to vary the lateral resilience of the assembly.

A mounting according to the invention can be used to mount a reaction rail having a generally "U"-shaped base formed of two spaced arms joined by a web portion and an electrically conductive reaction plate mounted, or mountable, on the base to extend away from the arms, each mutual connection lying, in operation, within the cavity defined by the web portion and the two spaced arms of the base and each first leaf spring means being arranged for releasable connection to the free end of a respective arm of the "U"-shaped base. Alternatively, a mounting according to the invention can be used to mount a reaction rail having a generally "U"-shaped base formed of two spaced arms joined by a web portion and an electrically conductive reaction plate mounted, or mountable, on the base to extend away from the arms, the leaf springs of each spring arrangement extending away from the reaction rail to their mutual connection, the second leaf spring means having its end remote from the mutual connection bent laterally of the mounting for connection to the track at its free end and the first leaf spring means extending beyond the bend of the second leaf spring means to a free end arranged for releasable connection to the free end of a respective arm of the U-shaped member.

Figure 2:
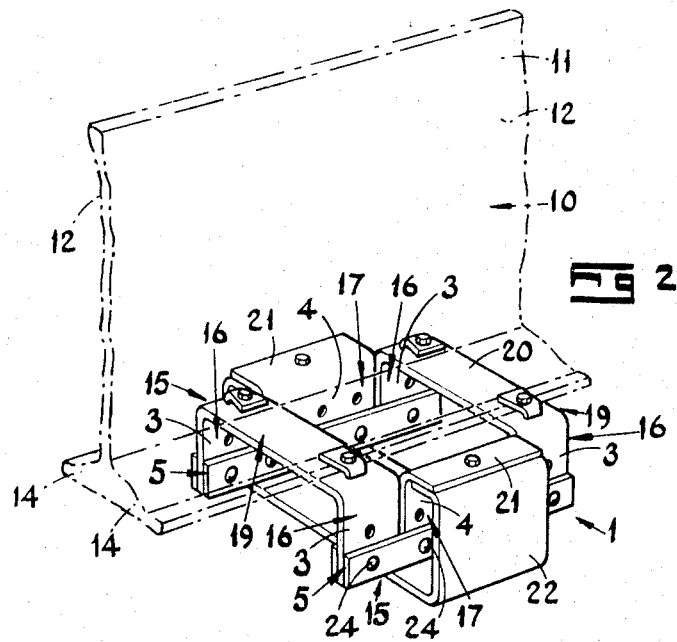
Figure 3:
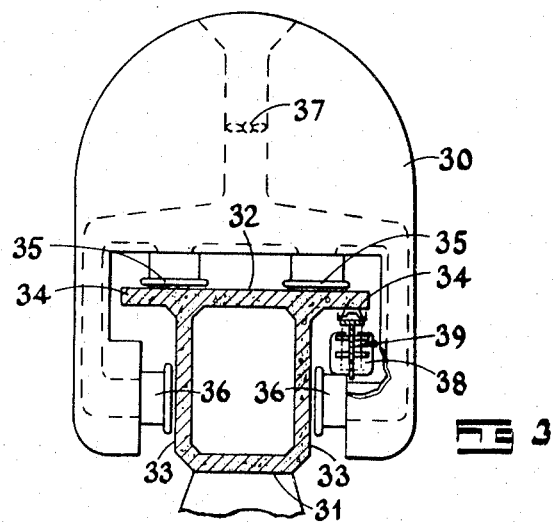
Figure 4:
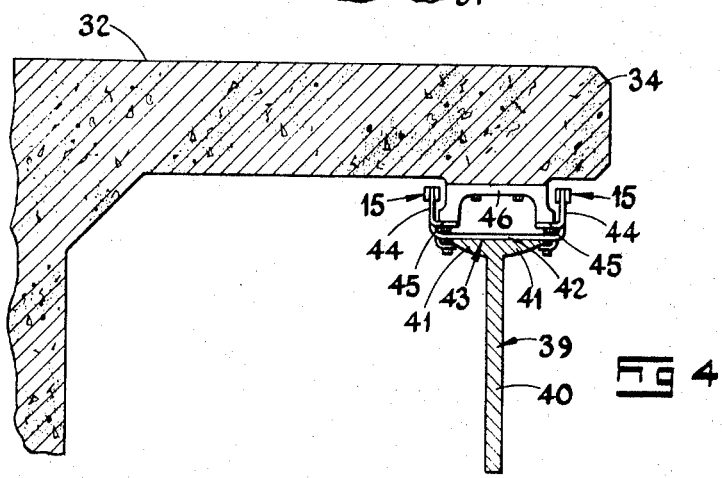
Figure 5:
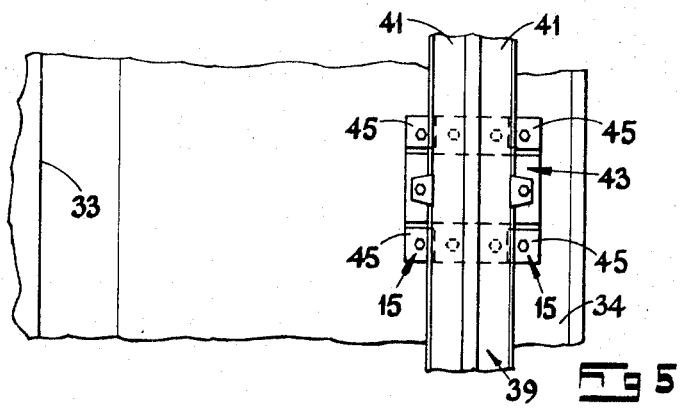

In order that the invention may be more fully understood, eight embodiments of the invention will now be described, by way of example, with reference to the accompanying drawings each of which shows the mounting having a linear induction motor reaction rail mounted upon it. In the drawings:

FIG. 1 is an end elevation of the first embodiment, showing a carriage including a linear induction motor stator mounted for operation along the reaction rail, FIG. 2 is a perspective view of the embodiment of FIG. 1, FIG. 3 shows the second embodiment in its application to a tracked hovercraft system, FIG. 4 shows the embodiment of FIG. 3 in end elevation, FIG. 5 is an underneath plan view of the embodiment of FIG. 3, FIG. 6 shows the third embodiment in end elevation, FIG. 7 is a perspective view of the embodiment of FIG. 6, FIG. 8 shows the fourth embodiment in end elevation, FIG. 9 is a perspective view of the embodiment of FIG. 8, FIG. 10 shows the fifth embodiment in end elevation, FIG. 11 shows the sixth embodiment in transverse cross-section, FIG. 12 is a perspective view of the embodiment of FIG. 11, FIG. 13 shows the seventh embodiment in transverse cross-section, and FIG. 14 shows the eighth embodiment in transverse cross-section.

FIGS. 1 and 2 show a mounting 1 attaching to a prepared track 31 a reaction rail 10 which includes an electrically conductive reaction plate 11 for co-operation with a double-sided linear induction motor stator 13 connected to tracked hovercraft (not shown) operable along the track so as to propel the vehicle. (Such a vehicle is shown in British Pat. No. 1002588.)

The vertical reaction plate 11, consisting of non-magnetic material such as aluminium is approximately 30 cm. high, with opposite faces 12. The faces 12 serve to guide the stator 13 from the reaction rail 10 via wheels 8 connected to the tracked hovercraft. The upper surface 2 of the reaction plate 11 provides a supporting surface for wheels 9 connected to the vehicle which support the stator. Flanges 14 integral with the reaction plate 11, extend laterally with respect to, and from the lower edges of, the plate 11, one on each side.

The mounting 1 includes two spring arrangements 15, one on each side of the plate 11. Each spring arrangement 15 comprises first leaf spring means 16 and second leaf spring means 17. Each first leaf spring means 16 comprises two leaf springs 3, one on each side of the second leaf spring means 17, connected to the reaction rail and each second leaf spring means 17 comprises one leaf spring 4 indirectly connected to the track 31. The leaf springs 3 and 4 of each spring arrangement 15 are each disposed generally in a common plane which is parallel to and displaced laterally from the plate 11. In each spring arrangement 15, the leaf springs 3 and 4 extend the plate 11 away from the flanges 14, in the same direction (i.e., downwardly), transversely of the reaction rail 10 to the mutual connection 5. The leaf springs 3 of the first leaf spring mans 16 of both spring arrangements 15 are formed by the limbs of two "U"-shaped members 19 with the central parts 20 of the "U"-shaped members being connected to the reaction rail at the flanges 14.

The leaf springs 4 have integral extensions 21 extending laterally away from each other for connection to the track. The extensions 21 lie in the same plane as the central parts 20 of the "U"-shaped members 19. The extensions 21 are fixed to a spacer 22 bolted to the track to space the spring arrangements from the generally flat surface 18 of the track.

The leaf springs 3 and 4 of each spring arrangement 15 are formed from the same resilient material. In each spring arrangement, the width of the leaf spring 4 equals the sum of the widths of the two leaf springs 3, and the lengths of all leaf springs are equal. Thus, the first and second spring means of each spring arrangement have the same modulus of elasticity and the same natural length.

Each connection 5 comprises two elements 23 which extend on both sides of, and clamp together, the leaf springs 3, 4. The elements 23 are held together by bolts 24, and upon loosening the bolts 24 the elements 23 can be moved along the length of the springs 3 and 4 to alter their effective lengths and thus to vary the lateral resilience of the mounting.

If a force is applied to the plate 11 tending to move it to the left as seen in FIG. 1, the central parts 20 of the "U"-shaped members 19 will move to the left and the vertical leaf springs 3 and 4 will deflect symmetrically so that the mutual connections will move to the left by half the amount of the movement of the central parts 20. Since the two leaf springs 3 together have the same width as the leaf spring 4 and have the same effective length, the bending stiffnesses of the leaf spring means 16 and 17 are equal. From a consideration of symmetry, it will be seen that flexing of the leaf springs causes the reaction plate 11 to undergo lateral movement without any other substantial movement, rotational or translational. The necessary shortening of the leaf spring means 16 and 17 to allow deflection is taken up by vertical movement of the mutual connections 5.

FIG. 3 shows a tracked hovercraft 30 mounted on a concrete track 31. The track 31 has a horizontal surface 32 for supporting the vehicle and vertical surfaces 33 for guiding the vehicle. The track 31 has lateral extensions 34 so that the surfaces 33 are closer together than the width of the surface 32. The vehicle has hoverpads 35 for supporting it from the surface 32, and hoverpads 36 for spacing it from the surfaces 33. The hoverpads 35 and 36 are fed by fans 37. The vehicle 30 is connected to a double-sided linear induction motor stator 38 disposed beneath one of the lateral extensions 34 which co-operates with a reaction rail 39 extending downwardly from the extension 34.

FIGS. 4 and 5 show in detail the reaction rail 39 of FIG. 3. The reaction rail 39 has a reaction plate 40 integral with flanges 41. The flanges 41 are connected to the central part 42 of a "U"-shaped member 43 of the mounting similar to the "U"-shaped members shown in FIGS. 1 and 2. The mounting differs from that of FIGS. 1 and 2 principally in that there is a single "U"-shaped member 43 constituting the first leaf spring means and two leaf springs 44 in each spring arrangement 15 connected to the track constituting the second leaf spring means, and in that extensions 45 of the springs 44 extend inwardly towards each other and are secured to a single spacer 46 fixed to the track. The advantage of this arrangement over that of FIGS. 1 and 2 is that the mounting is more compact.

A damper can be provided for either of the two mountings described above by setting the leaf springs in a block of elastomeric material such as neoprene.

The mounting shown in FIGS. 6 and 7 is similar to the mounting shown in FIGS. 1 and 2 in that each leaf spring is disposed in a plane which is parallel to, and displaced laterally from, the plate 11. However, in each spring arrangement 15 of FIGS. 6 and 7, the first leaf spring means (comprising one leaf spring 50) is disposed in opposition to, rather than in longitudinally offset relation from, the second leaf spring means (which comprises one leaf spring 51). The leaf springs 50 and 51 of each spring arrangement 15 extend in the same direction (i.e., downwardly) transversely of the reaction rail to a mutual connection, where they are clamped together with a spacer 53 between them. If a sufficiently large lateral force is applied to the reaction plate 52, the top of the leaf spring 51 will contact the spring 50, thus acting as a stop to limit further deflection.

The mounting shown in FIGS. 8 and 9 differs from that shown in FIGS. 6 and 7 in that, in each spring arrangement 15, the leaf springs 60, 61 are clamped together at their mutual connection 5 but then diverge at a slight angle so that their ends remote from the connection 5 are spaced apart laterally. In this embodiment of the invention also, the springs 60, 61 lie opposite each other and act as a stop to limit lateral displacement of the reaction rail 39.

In the mounting shown in FIG. 10, in each spring arrangement 15, the first leaf spring means comprising one leaf spring 70, is integral with the second leaf spring means, comprising one leaf spring 71. The first and second leaf spring means of each spring arrangement are constituted by a single sheet of resilient material (e.g., spring steel) bent back on itself. The leaf springs 70, 71 are spaced by a spacer 74 to which the leaf springs 70, 71 are clamped, the spacer being essential only if there is a likelihood of large vertical forces acting on the rail 39. Upon lateral displacement of the rail 39, both leaf springs 70 and 71 of each spring arrangement 15 deflect, the displacement being limited by the tendency of the ends of the leaf springs remote from their mutual connection 5 to come into contact when sufficiently loaded.

Damping can be achieved by inserting a resilient block between the leaf springs 50 and 51, 60 and 61, or 70 and 71.

FIGS. 11 and 12 show a reaction rail 80 having a generally "U"-shaped base 81 and an electrically conductive reaction plate 82 mounted on the mounting 83. The base 81 has two spaced arms 84, one on each side of the reaction plate 82, joined by a web portion 85. The reaction plate 82 extends away from the arms 84. The mounting 83 comprises two spring arrangements 86, one on each side of the reaction plate 82, each spring arrangement comprising first leaf spring means, in the form of two integral leaf springs 87, and second leaf spring means, in the form of one leaf spring 88. The two leaf springs 87 of each spring arrangement lie one on either side of each leaf spring 88, the springs 87, 88 lying generally in a common plane which is parallel to, and displaced laterally from, the reaction plate 82. In each spring arrangement 86 the leaf springs 87,88 extend in the same direction (i.e., downwardly) transversely of the reaction rail 80 to their mutual connection 89. Each second leaf spring means 88 has its end remote from the mutual connection 89 bent laterally inwards of the mounting 83 and is connected to the track 91 at its free end 90. The first leaf spring means 87 of each spring arrangement extends beyond the bend 92 of the respective second leaf spring means to a free end 93 releasably connected to the free end 95 of the respective arm 84 of the reaction rail 80 by a clamping arrangement 94.

FIG. 13 shows another reaction rail 80 having a generally "U"-shaped base 81 and an electrically conductive reaction plate 82 mounted on the mounting 83. The base has two spaced arms 84, one on each side of the reaction plate 82, joined by a web portion 85. The reaction plate 82 extends away from the arms 84. The mounting 83 comprises two spring arrangements 86, each consisting of first and second leaf spring means 96 and 97 respectively. The second leaf spring means 97 of each spring arrangement comprises two integral leaf springs, one on each side of the first leaf spring means 96 which consists of a single leaf spring. The leaf springs of the first and second leaf spring means of each spring arrangement 86 are generally disposed in a common plane which is parallel to, and displaced laterally from, the reaction plate, and extend in the same direction (i.e., upwardly) transversely of the reaction rail to their mutual connection 89. This mutual connection lies within the cavity 98 defined by the web portion 85 of the base 81 and the spaced arms 84. The first leaf spring means 96 are releasably connected to the free end 100 of the respective arms 84 of the base 81 of the reaction rail 80 by clips 99, and the second leaf spring means are bent laterally outwards of the mounting 83 at their ends 101 remote from the respective mutual connections 89 for connection to the track clamp 102. The track clamp 102 is attached to the track 91 by bolts, but it is spaced from the track by a cork sheet 103.

FIG. 14 shows a similar mounting to that of FIG. 13, but adapted to be clamped to a closely similar reaction rail to that of FIG. 13 by a Mills jaw and key 104. The first leaf spring means 96 of each spring arrangement 86 is clamped at a free end 93 between a horizontal plate 105, extending between and laterally beyond the spaced arms 84 of the base 81 of the reaction rail 80, and the respective spaced arm 84 by a Mills jaw and key. Each Mills jaw 106 extends through a hole 107 in the plate 105 located outwardly of the base 81 and is locked by a key 108.

Each of the described embodiments of the invention is so arranged that, in use, a side force imposed upon the associated reaction plate will cause the reaction plate to move laterally with little or no other motion, rotational or translational. Thus the invention provides a mounting which allows a reaction plate supported on it to follow lateral movements of the associated stator, without, for example, any substantial lifting or tilting movement. The possibility of damage to the motor is thereby reduced.

It will be appreciated that the invention is not limited to mountings for reaction rails having their reaction plates in a vertical plane. Thus, for example, a mounting in accordance with the invention may be used for supporting a horizontal reaction plate.

In addition, the invention is not limited in application to the mounting of reaction rails forming part of a tracked hovercraft system, but may be applied to, for example, systems in which vehicles are supported and guided by wheels for operation along a prepared track.

I claim:

1. A mounting for attaching to a prepared track a reaction rail including an electrically conductive reaction plate for cooperation with a double-sided linear induction motor stator connected to a vehicle operable along the track so as to propel the vehicle, the mounting comprising two spring arrangements one to be disposed on each side of the plate, each spring arrangement comprising first and second leaf spring means adapted for connection to the reaction rail and the track respectively, each leaf spring means comprising a leaf spring disposed generally in a plane which is parallel to and displaced laterally from the reaction plate when the reaction rail is attached to the track, in each spring arrangement the leaf springs of the first and second spring means then extending in the same direction transversely of the reaction rail to a mutual connection therebetween, the leaf spring arrangements being such that in response to a side force imposed upon the reaction plate, flexing of the leaf springs causes the reaction plate to undergo lateral movement without any other substantial movement, rotational or translational.

2. A mounting as claimed in claim 1 in which the interconnected leaf springs of the first and second leaf spring means of each spring arrangement have the same modulus of elasticity and the same natural length.

3. A mounting as claimed in claim 1 in which, in each spring arrangement, the spring means are disposed in opposed relation to each other transversely of the reaction rail.

4. A mounting as claimed in claim 1 in which the interconnected leaf springs of the first and second leaf spring means of each spring arrangement lie substantially in the same plane and are offset longitudinally of the reaction plate.

5. A mounting as claimed in claim 1 in which, in each spring arrangement, the second leaf spring means comprises two integral leaf springs, one on each side of the leaf spring of the first leaf spring means.

6. A mounting as claimed in claim 4 in which, in each spring arrangement, the first leaf spring means comprises two leaf springs, one on each side of the leaf spring of the second leaf spring means.

7. A mounting as claimed in claim 1 in which, in each spring arrangement, the first and second leaf spring means are integral with each other.

8. A mounting as claimed in claim 7 wherein, in each spring arrangement, the first and second leaf spring means are constituted by a single sheet of resilient material bent back on itself.

9. A mounting as claimed in claim 1 in which the leaf spring of the first leaf spring means of one spring arrangement is formed by one limb of a "U"-shaped member, and the leaf spring of the first spring means of the other spring arrangement is formed by the other limb of the "U"-shaped member, the central part of the "U"-shaped member being adapted for connection to the reaction rail.

10. A mounting as claimed in claim 1 for a reaction rail having a generally "U"-shaped base formed of two spaced arms joined by a web portion and an electrically conductive reaction plate mounted on the said base to extend away from said arms, wherein, when the reaction rail is attached to the track, each said mutual connection lies within the cavity defined by the web portion and the two spaced arms of the base, and each first leaf spring means is releasably connected to the free end of a respective arm of the "U"-shaped base.

11. A mounting as claimed in claim 1 for a reaction rail having a generally "U"-shaped base formed of two spaced arms joined by a web portion therebetween and an electrically conductive reaction plate mounted on the said base to extend away from said arms, wherein, when the reaction rail is attached to the track, the leaf springs of each spring arrangement extend away from the reaction rail to their said mutual connection, the second leaf spring means having its end remote from the mutual connection bent laterally of the mounting and connected to the track at its free end, and the first leaf spring means extending beyond the bend of the second leaf spring means to a free end releasably connected to the free end of a respective arm of the "U"-shaped base.

* * * * *